United States Patent
Unger

Patent Number: 5,158,806
Date of Patent: * Oct. 27, 1992

[54] METHOD AND APPARATUS FOR MANUFACTURING FIBRE-REINFORCING MATERIAL

[75] Inventor: Michael Unger, Porvoo, Finland

[73] Assignee: Neste OY, Finland

[*] Notice: The portion of the term of this patent subsequent to Apr. 28, 2009 has been disclaimed.

[21] Appl. No.: 514,134

[22] Filed: Apr. 25, 1990

[30] Foreign Application Priority Data

May 10, 1989 [FI] Finland .................................. 892264

[51] Int. Cl.⁵ .................................. B05D 1/26
[52] U.S. Cl. ................... 427/359; 427/355; 427/389.9; 427/369; 427/389.8; 427/398.1
[58] Field of Search ........... 427/389.9, 434.5, 389.7, 427/420, 358, 355, 359, 369, 398.1

[56] References Cited

U.S. PATENT DOCUMENTS

| | | | |
|---|---|---|---|
| 3,323,941 | 6/1967 | Van Dijk | 427/389.8 |
| 3,513,017 | 5/1970 | Waters et al. | 427/420 |
| 3,526,535 | 9/1970 | Plumat | 427/420 |
| 3,556,832 | 1/1971 | Park | 427/358 |
| 3,849,174 | 11/1974 | Ancker | 427/373 |
| 3,941,901 | 3/1976 | Harsch | 427/108 |
| 4,113,903 | 9/1978 | Choinsk | 427/420 |
| 4,216,290 | 8/1980 | De Beul et al. | 427/358 |
| 4,537,801 | 8/1985 | Takeda | 427/356 |
| 4,588,614 | 5/1986 | Lauchenauer | 427/389.9 |
| 4,675,208 | 6/1987 | Kageyama et al. | 427/434.5 |
| 4,717,603 | 1/1988 | Chino et al. | 427/434.5 |
| 4,804,509 | 2/1989 | Angell, Jr. et al. | 427/211 |
| 5,004,643 | 4/1991 | Caldwell | 428/246 |

*Primary Examiner*—Michael Lusignan
*Assistant Examiner*—Diana L. Dudash
*Attorney, Agent, or Firm*—Steinberg & Raskin

[57] ABSTRACT

A method for impregnating fibre bundles with molten or liquid resin in manufacturing a fibre-reinforced material, which material comprises one or more fibre bundles, wherein each fibre is surrounded by matrix resin, by impregnating a continuous web (10;10a) of one or more fibre bundles with molten or liquid resin (32, 33) and solidifying the resin by cooling or chemical reaction. During the impregnation the molten or liquid resin (35) material is made subject to shear forces by bringing it between two closely nearby surfaces (10;10a, 36;37) which are in moving relationship to each other.

4 Claims, 4 Drawing Sheets

METHOD AND APPARATUS FOR MANUFACTURING FIBRE-REINFORCING MATERIAL

Reference is made to Applicant's two commonly assigned applications filed simultaneously herewith corresponding to Finnish applications FI 892265 and FI 892266 and having the same title as this application.

BACKGROUND OF THE INVENTION

The present invention concerns a method and apparatus for manufacturing a fibre-reinforced material. Specifically the present invention concerns a method and apparatus for manufacturing fibre-reinforced material, which is formed by a reinforcing fibre bundle or bundles bonded with a matrix forming resin material in such a way that the individual fibres are surrounded by resin material.

The main problem in the manufacture of products of this kind is the high viscosity of some matrix forming materials. Because the individual fibres in the fibre bundles are very tightly near each other, it is thereby difficult for the resin material to penetrate into the bundle to surround all individual fibres. However such penetration is necessary in view of the desired properties of the product, such as strength, stiffness, chemical resistance etc.

Many methods have been tried to solve the problem. In one solution fibre bundles are transferred through a so-called cross-head die, in which molten or liquid resin is penetrated into the fibre bundles moving through the die. In the so-called powder method a web of fibre bundles is transferred through a bed of thermoplastic resin particles, whereby the web of fibre bundles carries along resin particles, which at a later state are melted. There are also solvent methods in which fibre bundles are impregnated with resins dissolved in a liquid medium.

The cross-head die method has proven to be ineffective in the impregnation of fibre bundles with thermoplastic resin because all individual fibres will not be surrounded by resin material. Powder methods have been proven to necessitate a multiplicity of processing stages which are difficult to synchronize, are expensive to purchase and operate while damaging the reinforcement. In solvent methods a drying process is required, which is expensive, causes environmental problems, is time-consuming and limits the production rate. Furthermore the quality of the product is low due to voids left after the removal of solvents.

SUMMARY OF THE INVENTION

The present invention provides a method and apparatus for impregnating reinforcing fibres in the form of fibre bundles so that individual fibres are surrounded by bonding resin. The invention is based on the known phenomena that some pseudoplastic materials being subjected to shear stresses experience a decrease in viscosity. This phenomena, known as shear thinning, is common for various emulsions, dispersions, suspensions and other materials including melts of thermoplastic resins and solutions of thermoset resins. The amount of this shear thinning can be altered with the level of shear stress applied to the material. At low stresses a small degree of thinning is achieved, but at intermediate shear stresses the degree of shear thinning increases dramatically, while at very high shear stresses the degree of thinning reverts to low levels as the material approaches minimum viscosity.

A typical range of viscosity for thermoplastic resin materials is $10^2$–$10^6$ PaS and for thermoset resin solutions 100–5000 PaS. In the impregnation of reinforcing fibres a range of 1–10 PaS is ideal, a common magnitude is $10^2$ PaS and in some cases $10^3$ PaS can be acceptable. Typical shear rate ranges for polymer metals and solutions are $10^{-1}$–$10^6$ 1/S and the range of maximum response can be $10^0$–$10^4$ 1/S.

The method according to the invention comprises the step of impregnating fibre bundles with molten or liquid resin while manufacturing a fibre-reinforced material, which material comprises one or more fibre bundles, wherein each fibre is surrounded by matrix resin, by impregnating a continuous web of one or more fibre bundles with molten or liquid resin and solidifying said resin by cooling or chemical reaction. The method of the invention is characterized in that during said impregnation said molten or liquid resin material is made subject to shear forces by bringing it between closely proximate surfaces which are in moving relationship relative to each other.

According to an advantageous embodiment of the method according to the invention one of said surfaces is a stationary surface and the other surface is a moving surface. However, both of said surfaces can be moving surfaces as well. The essential feature in view of the invention is that said surfaces are close to each other and that they are in moving relationship relative to each other.

According to an advantageous embodiment of the method according to the invention one of the moving surfaces comprises the continuous web of a fibre bundle itself or bundles themselves to be impregnated. In this case the resin to be impregnated is led between one fibre bundle to be impregnated and the stationary or moving surface, whereat the surfaces naturally are moving in different directions to each other. This causes shear forces that are directed to the resin to be impregnated and decrease the viscosity of the resin and facilitate the covering of the individual fibres with resin.

According to an advantageous embodiment of the method according to the invention the moving surfaces are surfaces of cylindrical or annular elements, in which case one of the surface is formed by the web to be impregnated. Said surfaces can also be planar surfaces, wherein one of the surfaces can be the web to be impregnated itself or said surfaces can be formed of two discs that rotate in opposite directions and are closely proximate to each other.

With the method of the invention it is possible to manufacture any fibre reinforced material, in which the fibres are in the form of bundles. The fibres can be any kind of fibres bondable by a matrix resin. Such products are for example fibre-reinforced granules for injection molding or other processes, prepregs or preimpregnated materials for additional processes such as extrusion, filament winding, tape laying, etc.

Suitable fibres for the invention are thus glass fibres, carbon fibres and aramid fibres and thermoplastic fibres. Most common fibre materials to be used are glass fibre products in the form of bundles, which can be used as single bundles or also in the form of woven products, for example as glass fibre rovings. Typically glass fibre bundles contain thousands of individual fibres with a diameter of 10–17 $\mu$m.

The resin material to be used for bonding fibre-reinforced products can be a thermoplastic resin, which is impregnated into fibre bundles as melt, or a thermosetting resin, which will be solidified after impregnation with heat or chemical reaction.

Suitable thermoplastic resins are among others olefine homogeneous polymers and copolymers, vinyl chloride homogeneous polymers and copolymers, polyethylene terephtalate, acrylonitrile homogeneous, polymers and copolymers, polyamides or copolyamides, thermoplastic polymers or formaldehyde, polycarbonate, polysulphone and mixtures of two or more of any of the polymers above or in general any other thermoplastics which show decreased viscosity by shearing action.

The invention concerns also an apparatus for impregnating reinforcing fibres in the form of fibre bundles in manufacturing fibre-reinforced material, which material comprises one or more bundles, wherein each fibre is surrounded by matrix resin. The apparatus of the invention is characterized in that it comprises means for subjecting shear forces during said impregnation into said molten or liquid resin, said means consisting of two closely nearby surfaces, between which surfaces said molten or liquid resin material is forced to flow and thus made subject to shear forces during impregnation, and means for feeding said molten or liquid resin material between said surfaces.

According to an advantageous embodiment of the apparatus according to the invention at least one of said surfaces is a moving surface.

According to an advantageous embodiment of the apparatus according to the invention both of said surfaces are moving surfaces.

According to an advantageous embodiment of the apparatus according to the invention one of said surfaces comprises a web of a fibre bundle to be impregnated.

According to another embodiment of the apparatus according to the invention said surfaces are cylindrical or planar surfaces.

According to an advantageous embodiment of the apparatus according to the invention said means for feeding molten or liquid resin between said surfaces comprise one or more feed openings in the wall of an impregnation head, which openings have circular, rectangular or other cross-section.

According to an advantageous embodiment of the apparatus according to the invention said feed openings are one or more slits cut into the wall of an impregnation head.

According to an advantageous embodiment of the apparatus according to the invention said impregnation head is connected to the outlet of an extruder.

According to an advantageous embodiment of the apparatus according to the invention the impregnation head is curved or planar within the area of impregnation.

BRIEF DESCRIPTION OF THE DRAWINGS

The invention will be further illustrated but now limited by referring to the enclosed figures, in which.

PREFERRED EMBODIMENTS OF THE INVENTION

Figure 1:
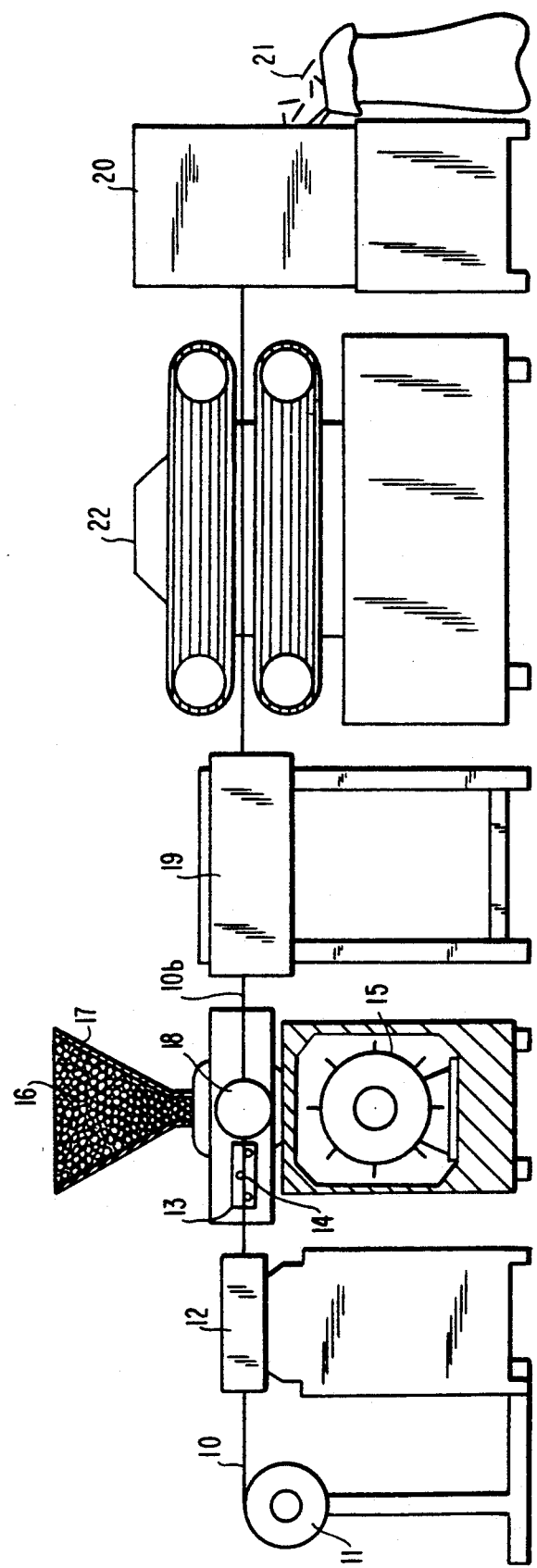
FIG. 1 is an elevational view, partly in section, of an apparatus according to the invention applied for manufacturing continuously fibre-reinforced thermoplastic granules.

In FIG. 1 a web 10 of glass fibre bundles is supplied from a drum 11 through a preheating chamber 12 and a spreading device 13 into an impregnation head 18. In the spreading device 13 the web 10 is transported via a set of rolls 14, so that the fibre web runs in an alternating way over and under the rolls. This spreads the individual fibres in the bundles and thus facilitates the impregnation in the impregnation stage. However this spreading device 13 is not necessary and it does not form a part of the invention. The impregnation head 18 is connected to an extruder 15, into which the resin material 16 to be impregnated is fed through a hopper 17. In the extruder 15 the resin is melted and is formed to be ready to be fed to the impregnation head 18 according to the invention.

The resin impregnated web 10b or band of fibre bundles is then transferred to a cooling unit 19, where the molten resin is solidified by cooling. The solidifying can also take place by chemical reaction, whereat the impregnated resin may contain additives necessary for the solidifying and, in the solidifying, extra heating can naturally be used, if necessary.

From the cooling unit 19 the resin impregnated and solidified fibre bundles are then transferred to a chopper 20, which cuts the impregnated web to pieces 21 of proper length, which are ready for packing or are ready to be used for manufacture of the products. With the method the apparatus of the invention it is naturally also possible to prepare continuous fibre-reinforced products, which in that case are cut in pieces of desired lengths or are left completely uncut.

The transportation of the web 10 through the apparatus in FIG. 1 can be carried put by any suitable pulling device. A belt-driven pulling device 22 is schematically illustrated in FIG. 1.

Figure 2:
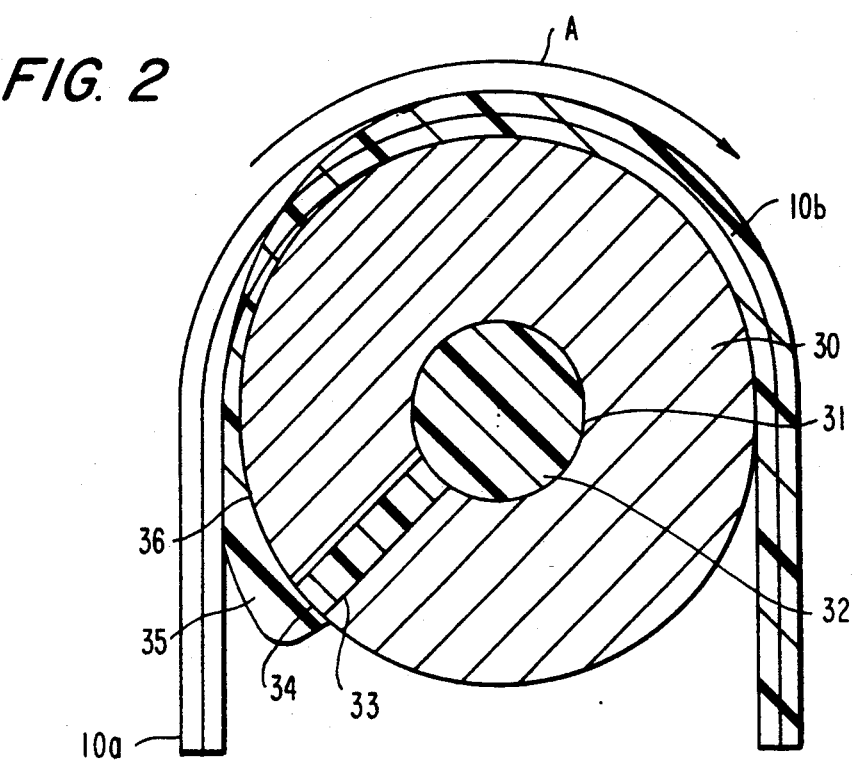
FIG. 2 is an end view of an impregnation head according to the invention, where the surfaces being in moving relationship with each other are formed by the fibre bundle web itself and the outer surface of a cylindrical impregnation head.

In FIG. 2 there is disclosed an impregnation head 30, inside which there is a feed channel 31. The resin 32 to be impregnated is pumped through this channel 31 for example from an extruder (not shown), where the thermoplastic resin to be impregnated is melted. From the channel 31 a feed opening 33 extends to the outer surface of the annular impregnation head 30 at point 34. The web of fibre bundles 10a travels to the direction marked with arrow A past this impregnation point 34, whereby the resin is pulled between the surfaces of the web 10a and the surface 36 of the impregnation head 30 and thus made subject to shear forces, which lower its viscosity and ensure a maximum impregnation of the fibre bundles. The fibre bundle web impregnated with resin is marked with 10b.

Figure 3:
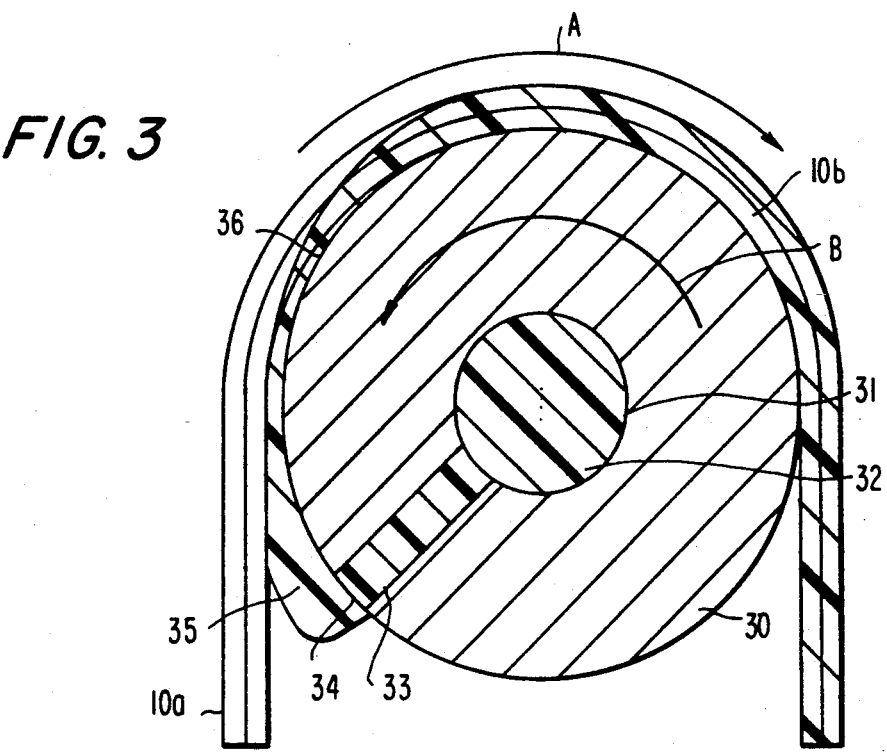
FIG. 3 is an end view of an impregnation head according to the invention, where the surfaces being in moving relationship with each other are formed by the fibre bundle web itself and the outer surface of a rotating impregnation head.

FIG. 3 shows another preferred embodiment to FIG. 2 except that the impregnation head 30 is formed by a rotating annular element which rotates it in the direction of arrow B. In this embodiment of the invention the shearing action is stronger and takes place within a longer area as in the apparatus according to FIG. 2.

Figure 4:
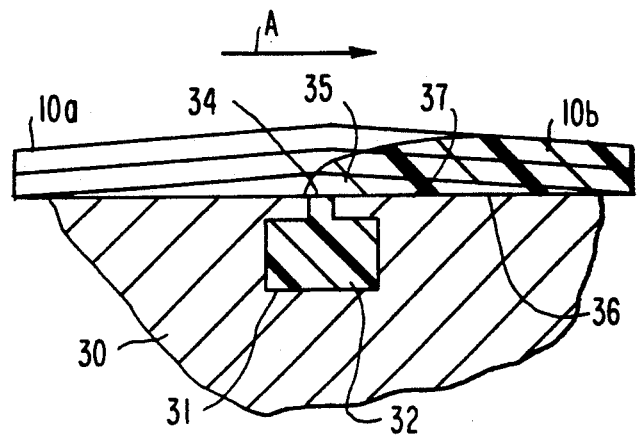
FIG. 4 is an end view of an impregnation head according to the invention, where the surfaces being in moving relationship with each other are formed by the fibre bundle web itself and the outer surface of the impregnation head, which outer surface is planar within the impregnation area.

In the embodiments according to FIGS. 2 and 3 the two elements, between which the shearing action takes place, have a cylinder-like form. In the embodiment of FIG. 4 the impregnation takes place between the planar surfaces 37 of the impregnation head 30 and the surface of web 10.

Figure 7:
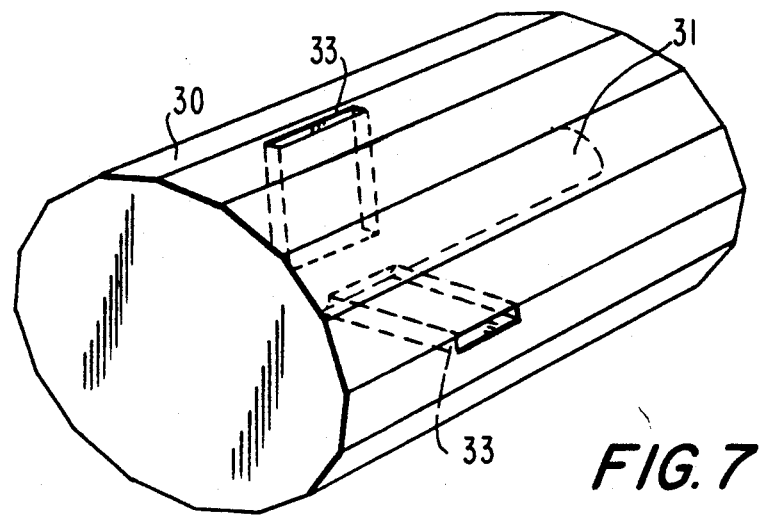
FIG. 7 is a detail of an impregnation head showing two slit-like feed openings having a round cross-section and opening to opposite sides of the impregnation head for supplying molten thermoplastic resin to the impregnation area.
Figure 5:
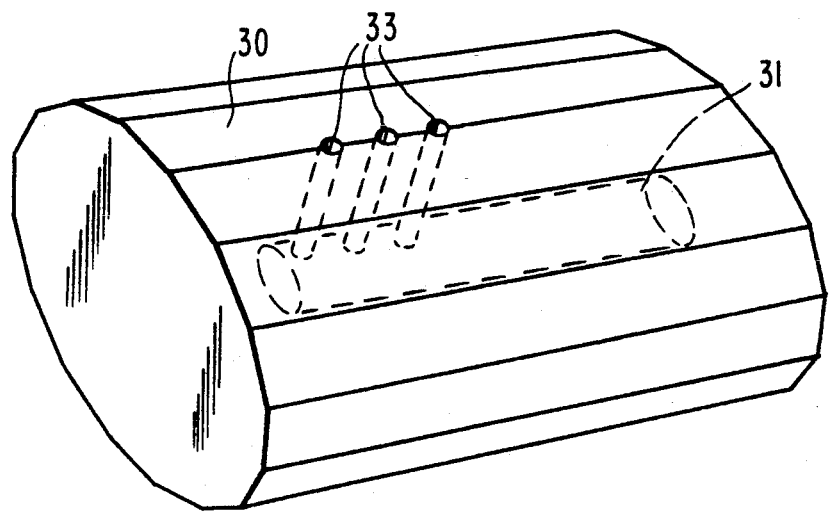
FIG. 5 is a detailed perspective view of an impregnation head showing several feed openings heaving a round cross-section for supplying molten thermoplastic resin to the impregnation area.
Figure 6:
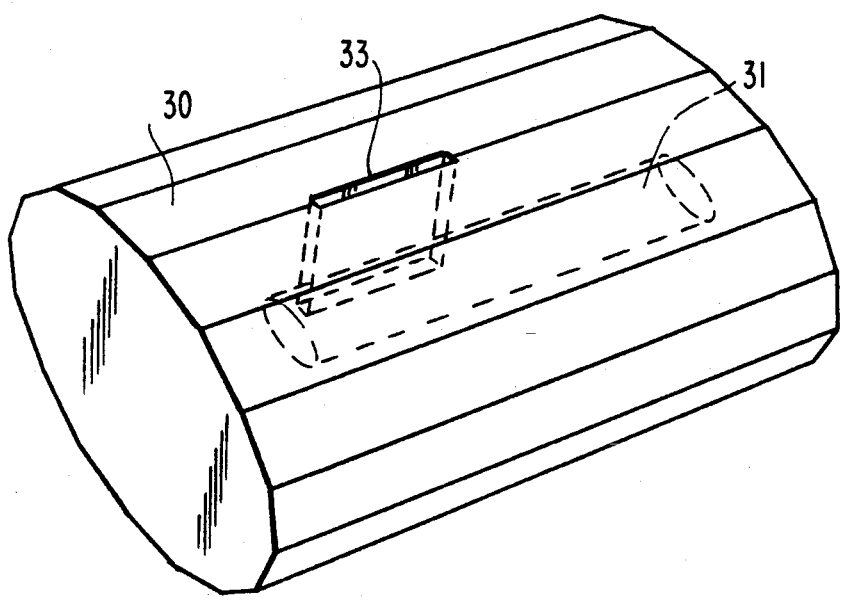
FIG. 6 is a detailed perspective view of an impregnation head showing one slit-like feed opening for supplying molten thermoplastic resin to the impregnation area.

In the preferred embodiments of FIGS. 5 and 6 different shapes of the feed openings 33 have been disclosed. In FIG. 5 there are three openings 33 with a circular cross-section. There can be one or more openings dependent on the width of the fibre bundle web 10. In FIG. 6 there is one slit-like feed opening 33, the width of which is approximately the same as the width of the fibre bundle web 10. In FIG. 7 there is disclosed an embodiment, in which there are two slit-like feed openings 33 to the opposite sides of the impregnation head 30. Of course there can be more than two slit-like feed openings. It is possible also in the embodiment of FIG. 5 to use two or more groups of feed openings 33.

Although the invention has been described above as applied to the impregnation of a moving fibre bundle web, it is evident that the fibre bundle web can be stationary and the impregnation head can be arranged to be movable. The function of the invention will be the same in both cases. Also, it is possible to use two or more impregnation heads according to the invention and these impregnation heads can be placed on the same or different sides of the fibre web to be impregnated.

Furthermore, it is possible to pretreat the resin to be impregnated in other ways within the scope of the methods and apparatuses of the invention such that its viscosity is decreased.

What is claimed is:

1. In a method for impregnating fibre bundles with thermoplastic resin by impregnating a continuous web comprising one or more fibre bundles with molten thermoplastic resin and after impregnation solidifying said resin by cooling, said molten resin having a viscosity greater than that which would enable said molten resin to penetrate said molten resin throughout the fibre bundles and to surround each individual fibre with said molten resin, the improvement comprising:
   passing said web along a curved surface, said web being in contact with said curved surface;
   feeding said molten resin onto said curved surface of between said web and said curved surface, the contact area between said web and said surface being sufficiently long to cause continuous and sufficient shear action to reduce the viscosity of said molten resin to a level required to allow said molten resin to penetrate said fibre bundles and to surround each individual fibre with said molten resin.

2. The method of claim 1, wherein said curved surface is a stationary surface.

3. The method of claim 1, wherein said surface is a cylindrical surface, further comprising rotating said cylindrical surface in an opposite direction to the direction of the web movement.

4. The method of claim 1, wherein said thermoplastic material is selected from the group consisting of olefine homogeneous polymers and copolymers, vinyl chloride homogeneous polymers and copolymers, polyethylene terephthalate, acrylonitrate polymers and copolymers, polyamide or copolyamides, thermoplastic polymers, formaldehyde, polycarbonate, polysulphone, and mixtures of two or more of said polymers and copolymers.

* * * * *